Feb. 23, 1965   K. GEISSBAUER   3,170,823
METHOD OF PRODUCING LEAD-ACID STORAGE BATTERY
PLATES AND PLATES SO PRODUCED
Filed Nov. 30, 1962   2 Sheets-Sheet 1
FIG. 1    FIG. 2
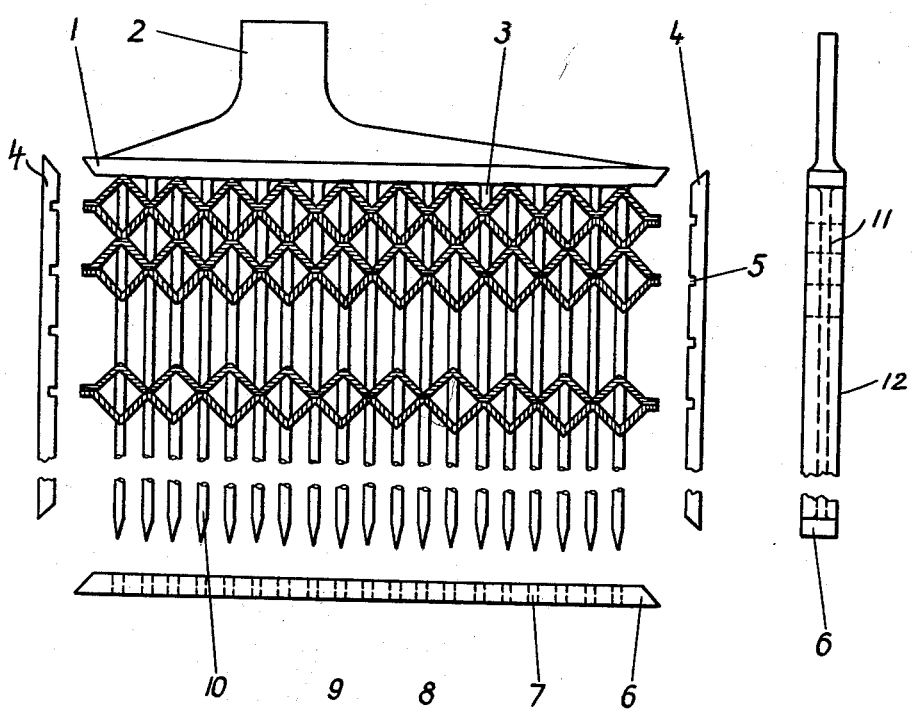
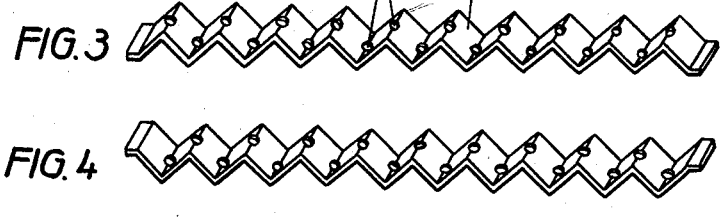
FIG. 3
FIG. 4
INVENTOR:
KARL GEISSBAUER
By
Erich M. H. Radde
AGENT Feb. 23, 1965   K. GEISSBAUER   3,170,823
METHOD OF PRODUCING LEAD-ACID STORAGE BATTERY
PLATES AND PLATES SO PRODUCED
Filed Nov. 30, 1962   2 Sheets-Sheet 2

INVENTOR:
KARL GEISSBAUER 3,170,823
METHOD OF PRODUCING LEAD-ACID STORAGE
BATTERY PLATES AND PLATES SO PRODUCED
Karl Geissbauer, Paul-Lagarde-Strasse 20,
Munich 12, Germany
Filed Nov. 30, 1962, Ser. No. 241,371
Claims priority, application Germany, Dec. 8, 1961,
D 37,624
12 Claims. (Cl. 136—38)

The present invention relates to improvements in the manufacture of lead-acid storage battery plates.

Conventional lead-acid storage battery plates include the pasted plates with a grid carrier structure for the active mass and the so-called "Ironclad" plates whose grid consists of a number of vertical spines and wherein microporous tubes surround the spines and hold the active mass. The capacity of these conventional plates is not fully satisfactory and it is the primary object of the present invention to produce lead-acid storage battery plates with a high capacity which is maintained constant over many charge and discharge cycles.

This and other objects are accomplished by considerably increasing the surface of the active mass in contact with the battery electrolyte while the amount of the active mass remains about the same as in similarly sized conventional plates.

It has been proposed to accomplish this by providing lead-acid storage battery plates with a multitude of small pockets carrying the active material paste thus to enable the electrolyte to penetrate the active material from all sides and to provide a plate of equal capacity to the conventional pasted plates and plates with tubes containing the active material but, in addition, a plate which imparts to the battery improved starting ability, i.e. which is capable of producing high current impulses in a short time. The plates provide a considerably increased active material surface for penetration by the electrolyte for the same amount of active material. In these improved plates, the active material carrying pockets are small, microporous, electrolyte-permeable synthetic resin tubes the axes of which extend perpendicularly to the surface of the carrier grid, the pockets forming a honeycomb structure on the grid surfaces. If desired, the tubes may not only be of hexagonal cross section but may also be rectangular or arcuate. They are fixed on the diagonally extending bars of the lattice grid in any desired manner.

While these improved storage battery plates are very effective, particularly in starting batteries, their manufacture is very complicated and, therefore, quite expensive.

In an effort to overcome this disadvantage and yet to produce this improved type of battery plate, I have now devised a simpler and, therefore, more economical method of producing such plates. In this method, I prepare narrow strips of microporous synthetic resin and impart zig-zag shape to the strips. The narrow strips may be stamped or cut from sheets of sintered thermoplastic resin powder, as have been conventionally used, for instance, in making the vertical tubes holding the active mass in the so-called "Ironclad" battery plates. Useful resins have been found to be polyvinyl chloride or polystyrene. The manufacture of such microporous synthetic resin sheets is, of course, well known and is, therefore, not described herein. Any material may be used, of course, including synthetic resin and glass fiber webs, as long as it is non-oxidizing and electrolyte-resistant.

The battery plate used in the present invention comprises a grid having a plurality of vertical bars which are, for instance, of lead or lead alloy, such as a lead-antimony alloy. The zig-zag microporous strips are slid onto the vertical bars of the grid with the apices in registry with the bars, the spacing between the strip apices corresponding to that of the vertical bars. Alternate apices of adjacent ones of the narrow strips point in opposite directions and are in contact, respectively, the strips extending transversely to the bars. In this manner, the strips form a honey-combed carrier structure of the grid for the active mass of the plate, which may be conventional lead oxide used in lead-acid batteries.

The honey-combed carrier structure is filled with the active mass until the same is flush with the edges of the strips so as to form a plane surface on both sides of the plate and the two surfaces are then covered with an electrolyte-resistant but permeable member, which may be of the same material as the strips, if desired, to prevent the active mass from being washed out of the carrier structure.

According to a preferred embodiment of this invention, the strips are perforated at their apices during their formation to permit ready sliding of the strips on the vertical bars.

When alternating strips are turned around by 180° before being slid onto the vertical bars, they will form the honey-combed structure, described hereinabove and which defines quadratic, hexagonal or similarly-shaped pockets for the active mass.

The above and other objects, advantages and features of the present invention will be more fully understood when considered in connection with the following detailed description of certain embodiments thereof, taken in conjunction with the accompanying drawing wherein:

FIG. 1 is a side elevational view of a lead-acid storage battery plate in the process of being assembled in accordance wtih the method of this invention;

FIG. 2 is a side view of the assembled plate of FIG. 1;

FIG. 3 is a perspective view of one of the strips forming the honey-combed active mass carrier structure of the plate;

FIG. 4 is similar to FIG. 3 but shows the strip turned by 180°;

Figures 5, 6:
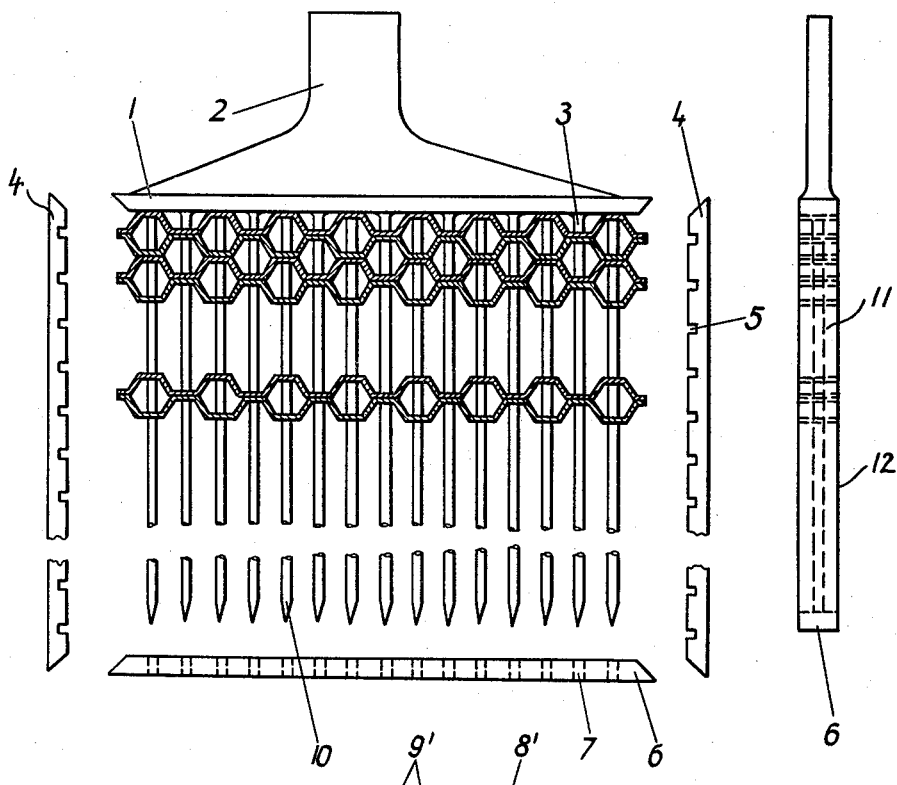
FIG. 5 is a view similar to that of FIG. 1 but showing another embodiment of the carrier structure.
FIG. 6 is a side view of the assembled plate of FIG. 5.

Referring now to the drawing, wherein like reference numerals designate like parts, there is shown a battery plate comprising a grid having a frame consisting of a top member 1, a bottom member 6 substantially parallel thereto and two parallel side members 4 interconnecting the top and bottom frame members. A plurality of vertical bars 3 extend from the top to the bottom member and are parallel to the side members of the frame. A lug 2 extends from the top member.

As shown, the lug, top member and vertical bars are formed into an integral unit which must be electrically conductive and will normally be made of lead or a suitable lead alloy, as conventional in lead-acid battery plate grids.

In the preferred embodiment shown in the drawing, the free ends 10 of the vertical bars opposite to the top member are pointed and the bottom member 6 of the frame has corresponding holes so that the bottom frame member may be mounted on the free ends of the vertical bars in the completion of the plate assembly.

Also, the side members 4 are preferably slotted at 5 to receive the contacting strip apices of adjacent strips, as shown.

To impart improved starting ability to the battery, i.e. to build a battery which is capable of producing high current impulses in a short time, it will be preferred to make the side frame members 4 and the bottom frame member 6 also of lead or a lead alloy, in which case the frame members will be soldered or be fused together when assembled. However, if it is desired to make the plates of light weight, the side and bottom frame members may be of any suitable electrolyte-resistant material so that current is conducted only through vertical bars 3 to the top member 1 and lug 2.

One form of zig-zag strips useful for the active mass carrier structure is shown in FIGS. 3 and 4. As seen therein, the strip 8 has been shaped into a continuous row of isosceles triangles, with the spacing between the apices of the triangles corresponding to the spacing between the vertical bars 3 of the grid shown in FIG. 1. Holes 9 are stamped into the triangle apices so that a plurality of such strips maybe slid onto the vertical bars to form the carrier structure shown in FIG. 1. After the carrier structure has thus been formed, the bottom and side frame members are placed in position to complete the plate assembly, whereupon the carrier structure is filled with active mass 11 and covered with a permeable sheet 12 on each side of the plate, as shown in FIG. 2. The sheet 12 may, if desired, consist of a glass wool or fabric web permeable to, but resistant to corrosion by, the electrolyte. Such separators between active material and electrolyte are well known in the lead-acid battery plate art and will, therefore, not be further described herein.

Figure 7:
FIGS. 7 and 8 are similar to FIGS. 3 and 4, respectively, but show the strip shape used in the plate of FIG. 5.
Figure 8:

The embodiment illustrated in FIGS. 5-8 is identical with that of FIGS. 1-4, except for the specific shape of the strips. As best shown in FIGS. 7 and 8, the strips 8' consist of a continuous row of half hexagons and holes 9' are stamped into the flat apices of the hexagons. Since this embodiment is in every other respect the same as hereinabove described, it will not be further described herein.

It is advantageous to merge the edges of the holes in the microporous strips, through which the strips are to slide onto the vertical bars, by heat treatment, so that the synthetic resin at these edges becomes impermeable for the electrolyte. Thus, the vertical bars are protected against the attack of the electrolyte by the synthetic resin also on those parts where they are not surrounded by the active mass. Preferably the merging of the hole edges as well as the perforation of the holes are carried out in one step, whereby a heated perforating tool may be used.

I claim:

1. In a method of producing a lead-acid storage battery plate comprising a grid having a plurality of vertical bars, the steps of preparing narrow strips of microporous material, imparting a zig-zag shape to said strips, the spacing between the apices of the zig-zag strips corresponding to the spacing between the vertical bars, and sliding the strips onto the vertical bars of the grid with the apices in registry with the bars, alternate apices of adjacent ones of said strips pointing in opposite directions and being in contact with each other, respectively, and the strips extending transversely to the bars whereby the strips form a honey-combed carrier structure on the grid for an active mass.

2. In the method of claim 1, the step of perforating the strips at their apices to permit ready sliding of the strips on the vertical bars.

3. In the method of claim 1, the step of imparting pointed ends to the vertical bars to permit ready sliding of the strips onto the bars.

4. In the method of claim 1, the step of perforating the strips at their apices and of merging the hole edges, so that the hole edges become impermeable for the electrolyte and their diameter corresponds as close as possible to that of the vertical bars.

5. The method of claim 4 characterized in that said step of merging said holes is performed by the application of heat to said hole edges.

6. The method of claim 5 further characterized in that said heat is applied simultaneously with the perforation of said strips which produces said holes.

7. In a method of producing a lead-acid storage battery plate comprising a grid having a frame consisting of a top member, a bottom member substantially parallel thereto and two parallel side members interconnecting the top and bottom members, and a plurality of vertical bars parallel to the side members and extending from the top to the bottom member, the steps of preparing narrow strips of microporous material, imparting a zig-zag shape to said strips, the spacing between the apices of the zig-zag strips corresponding to the spacing between the vertical bars, preparing an integral grid portion consisting of the top member and the vertical bars extending therefrom and having free ends opposite said top frame member, sliding said strips over said free ends onto the vertical bars of the grid with the apices in registry with the bars, alternate apices of adjacent ones of said strips pointing in opposite directions and being in contact with each other, respectively, and the strips extending transversely to the bars whereby the strips form a honey-combed carrier structure on the grid for an active mass mounting the bottom frame member on said free vertical bar ends, and mounting the side frame members between the top and bottom members, the side frame members having been slotted to receive contacting strip apices of adjacent ones of said strips.

8. In the method of producing the lead-acid storage battery plate of claim 7, the additional steps of filling the honey-combed carrier structure with the active mass and covering the structure with an electrolyte-resistant but permeable member to prevent the active mass from being washed out of the carrier structure.

9. A lead-acid storage battery plate comprising a grid having a frame consisting of a top member, a bottom member substantially parallel thereto and two parallel side members interconnecting the top and bottom members, and a plurality of vertical bars parallel to the side members and extending from the top to the bottom member; a lug extending from the top member; and a plurality of narrow strips of microporous synthetic resin of zig-zag shape mounted on the vertical bars and extending transversely thereto, the apices of the strips being in registry with the vertical bars and alternate apices of adjacent ones and being in contact with each other, respectively, whereby the strips form a honey-combed structure on the grid for an active mass.

10. A component for a storage battery, said component consisting of a strip of microporous synthetic resin, opposite faces of said strip being substantially parallel to each other, said strip having a zig-zag configuration in a direction transverse to its length, and each apex of said zag-zig being perforated, the edges of each said perforation being merged so as to be impermeable to the battery electrolyte.

11. The component of claim 10 characterized in that said zig-zags are in the form of adjacent legs of isosceles triangles.

12. The component of claim 10 characterized in that said zig-zags are in the form of half hexagons.

References Cited by the Examiner
UNITED STATES PATENTS

| | | | |
|---|---|---|---|
| 408,002 | 7/89 | Ernst | 136—17 |
| 556,027 | 3/96 | Samuels. | |
| 627,134 | 6/99 | McDougall | 136—58 |
| 845,048 | 2/07 | Bijur. | |
| 2,428,470 | 10/47 | Powers | 136—59 |
| 3,083,250 | 3/63 | Geissbauer | 136—63 |

JOHN H. MACK, *Primary Examiner.*